United States Patent Office 3,661,812
Patented May 9, 1972

3,661,812
PRODUCTION OF FREE-FLOWING AMINOPLAST FOAMS
Anton Buchner and Hans Lang, Limburgerhof, Johann Lenz, Ludwigshafen, Leo Unterstenhoefer, Limburgerhof, and Wilhelm Krieger, Ludwigshafen, Germany, assignors to Badische Anilin- & Soda-Fabrik Aktiengesellschaft, Ludwigshafen am Rhine, Germany
No Drawing. Filed Nov. 23, 1970, Ser. No. 92,279
Claims priority, application Germany, Dec. 4, 1969,
P 19 60 810.7
Int. Cl. C08j 1/16
U.S. Cl. 260—2.5 F        3 Claims

ABSTRACT OF THE DISCLOSURE

A process for improving the flowability of aminoplast foams prior to curing, particularly for covering soil, by incorporating coarse gas bubbles into foam containing fine bubbles.

---

The invention relates to a process for changing an aminoplast foam physically in such a way that in the fresh (uncondensed) condition it flows easily and therefore offers less resistance to shaping.

Aminoplast condensates which have been cured in the form of foam are suitable for many industrial purposes. Such foam has become particularly well known in the sector of insulation against cold, heat or sound and for its suitability as a humus substitute or primary humus in agriculture. In the narrower sense, aminoplast foams and foamed materials include materials built up from condensates of urea and formaldehyde.

These aminoplast foams can be prepared by foaming up solutions of precondensates of urea and formaldehyde together with cure catalysts and foaming agents in suitable apparatus and allowing solidification to take place under the action of catalysts. In the case of foam of condensates of urea and formaldehyde a solution containing a foaming agent and a cure catalyst is converted by means of a gas in suitable apparatus into an aqueous foam containing fine bubbles and a solution of a urea-formaldehyde precondensate is incorporated into this foam. A foam which is plastic when fresh is obtained having the consistency of stiff whipped cream which soon solidifies to an elastic to brittle article even at room temperature. Examples of apparatus suitable for the production of such aminoplast foam are described in German Pat. 443,658.

Aminoplast foams have the advantage over other foamed materials conventionally used in industry that they can easily be produced in situ and for example when these foams are used for insulation purposes they can be applied immediately to the places to be insulated. This advantage has on the other hand resulted in aminoplast foams being proposed, and also used for covering soil, particularly fresh-sown soil.

In both types of application it has been found however that the stiffness of the fresh aminoplast foam (which is not capable of flowing per se) constitutes a certain obstacle to its use. The aminoplast foam in this condition bonds only poorly with the surface to which it is applied. When it is used in agriculture to cover rows of seeds, the conseqeunce is that the most important purpose of such a covering, namely protection of the seed from wind and rain erosion, is only incompletely fulfilled.

The observation that the said defect is due to the poor flowability of fresh aminoplast foam has resulted in the present invention which has for an object to change the flowability of aminoplast foamed materials by physical means.

According to the invention a free-flowing fresh aminoplast foam is obtained by foaming up a solution of a foaming agent containing a hardener to a mean foam fineness of less than 0.2 mm. and mixing the foam with an aqueous urea-formaldehyde precondensate, when gas bubbles having a mean diameter of from 1 to 5 mm. are incorporated into the fresh aminoplast foam in an amount of from 0.8 to 2.5 times the volume of the foam. The theory is that the gas bubbles which are coarse as compared with the general foam structure act as a kind of joint and thus impart greater mobility to the fresh aminoplast foam; the invention is of course not limited to this theory.

Foam fineness is defined as the mean diameter of the fine bubbles generally forming part of the aminoplast foam structure.

In accordance with this invention, relatively coarse gas bubbles (in the simplest case and as a rule air bubbles) are incorporated into the foam containing the said fine bubbles immediately after its production, i.e. while still in the plastic condition, advantageously in the foaming device. In this way an aminoplast foam is obtained which contains relatively few large pores in addition to very many very fine pores. We have found by experience that some of the coarse bubbles escape during application of the fresh aminoplast foam. It is conceivable that the improved flowability of the fresh aminoplast foam is due in part to this process.

Urea-formaldehyde condensates which have been prepared with a molar ratio of urea:formaldehyde of from 1:1.3 to 1:2.5, particularly from 1:1.4 to 1:1.6, are particularly suitable for the process according to the invention.

The aminoplast foam to be used according to the invention is preferably produced with a unit weight of from 5 to 30, particularly from 12 to 25, kg./m.$^3$, by a conventional method. Solutions of foaming agent in water and containing a hardener according to the prior art and which contain per liter from about 8 to 15 g., particularly from 10 to 12 g., of a conventional foaming agent, as for example the sodium salt of dibutylnaphthalenesulfonic acid are suitable as the solutions of foaming agent containing a hardener. These solutions contain as cure catalysts (hardeners), also in the conventional manner, the usual cure catalysts for aminoplasts, i.e. for example acids such as phosphoric acid.

It has proved to be advantageous however in the case of the present invention to make the setting time of the aminoplast foam (i.e. the time which elapses during transition from the plastic to the elastic condition) fairly long, i.e. to provide a setting time of from about 30 to 40 seconds to about 60 seconds. This setting time (about twice as long for foam produced in the usual way from urea-formaldehyde condensates which has a setting time of from about 15 to 20 seconds) depends on the amount of hardener causing the condensation. Whereas normally the solutions of foaming agent containing hardener contain for example from 20 to 25 g./liter of phosphoric acid, this content varies in the process according to the invention from 6 to 9 g./liter. The most suitable concentration may be ascertained by means of a simple preliminary experiment in each case.

As a matter of interest it has been found that in the present process an adequately high flowability of the fresh aminoplast foam is also obtained when aminoplast precondensate solutions are used which have a higher content of solids than is customary in the art. Whereas resin solutions containing about 40% of solids are normally used, resins solutions having a solids content of from 70 to 80% may be used advantageously in the process according to the invention.

Incorporation of the gas bubbles into the fresh aminoplast foam advantageously takes place by supplying a mixed gas, propellent gas or air, advantageously through a thin tube which is arranged centrally in the tube through which normally the fresh foam issues from the manufacturing unit, the propellent gas being introduced at a distance from the foam outlet opening which is about three to eight times the diameter of the foam outlet opening.

It has further been found that particularly uniform layers of foam can be achieved without hard crusts when the said outlet tube of the foam-producing unit is located at a certain angle to the surface to be covered with foam and at a distance of from 1 to 10 cm., preferably 1 to 7 cm., above the surface to be covered with foam. Coarse bubbles, some of which escape from the hardened aminoplast foam, produce an additional porosity on the surface of the foam. This is particularly significant for the particularly important sector of application of the process, namely covering soil, because the additional porosity achieved facilitates the growth of plants through the layer of foam. Furthermore volatilization of remainders of free formaldehyde is improved and thus damage to the germ of the seed or of parts of the plants being covered with foam is avoided. In this application of the process according to the invention to agriculture, the bond between the special foam and the soil, in contrast to foam which has not been mixed with gas bubbles, is so good that even strong gusts of wind cannot blow it away.

The invention is explained in greater detail in the following example.

EXAMPLE

A single-seed planter mounted on the hitch at the rear of an ordinary farm tractor is used for sowing sugar beet seed in pill form. The hitch also carries a foaming unit which produces 3 m.$^3$ per hour of urea-formaldehyde foam having a unit weight of 3 kg./m.$^3$. The hardener added to the foaming agent is phosphoric acid. Its concentration is 7 g. per liter of foaming agent solution. A setting time for the foam of about thirty-five seconds is achieved. Compressed air, produced by a compressor beside the foam equipment, is used as propellent gas. The ratio of foam to compressed air (in m.$^3$) is 1:1.

The soil into which the seed is introduced consists of clay with which sand has been mixed and which has a strong tendency to crust.

The method of introducing the seed is as follows: In front of the gripping wheel of the planter which drives the seed disc (determining the spacing) and forms a cuneal rigid groove, means are provided for displacing the dry soil on both sides so that the groove is pressed into the moist earth. The seeds are laid therein at distances of 50 mm. Immediately thereafter a pressure roller moves over the sown seeds and presses them into the soil so that good soil contact is obtained.

The band is not then covered with earth, but with the above-mentioned foam material. This flows out immediately behind the pressure roller through a tube having a diameter of 10 mm. which is inclined at an angle of 45° and which is 60 mm. away from the soil, the foam forming in the groove a layer having a thickness of 5 mm. and a width of 40 mm. which covers completely the seed and edges of the groove.

By clearing away the dry soil on both sides, the seed passes into a moist environment which is favorable for germination. The shallow depression thus formed (which in the event of heavy rainfall or irrigation would otherwise become muddy) is not a disadvantage in the present method because there is a layer of foam instead of a layer of soil which would harden and impair sprouting. It has been found that even when the soil becomes very muddy on and around the band of foam material, the layer supplying air and water under and over the seed is not affected. It is only the outer porous zone of the foam material, which weathers slowly, which is permeated by soil; through the exchange of gas, air and water this promotes germination and makes possible fast emergence of the seedlings.

The sprouting rate of sugar beet sown at a depth of 1.0 to 1.5 cm. is therefore about 20% higher when covered with foam than when covered with soil. As the depth of sowing increases (4 cm.) to secure contact with the moisture in the soil, the difference becomes more pronounced and is more than 30%.

The new process is particularly suitable in climatic regions requiring irrigation or watering and having intensive cultivation of agricultural and horicultural crops on soils tending to crust for covering bands of seeds. It protects sensitive seeds and increases their sprouting rate.

We claim:

1. In a process for the production of aminoplast foams which are free-flowing in the non-cured fresh state by foaming up an aqueous solution of from 8 to 15 g. per liter of a foaming agent and an acid hardener to a mean bubble diameter of less than 0.2 mm. and mixing the aqueous foam with an aqueous urea-formaldehyde precondensate containing urea and formaldehyde in a molar ratio of from 1:1.3 to 1:2.5, the improvement which comprises incorporating into the foam mixture gas bubbles having a mean diameter of from 1 to 5 mm. in an amount of from 0.8 to 2.5 times the volume of the foam.

2. A process as in claim 1 wherein from 6 to 9 grams of phosphoric acid hardener is used per liter of said aqueous solution.

3. A process as in claim 1 wherein said gas is air.

References Cited

UNITED STATES PATENTS

| 3,150,108 | 9/1964 | Vieli | 260—2.5 F |
| 3,186,959 | 6/1965 | Shriver et al. | 260—2.5 F |
| 3,063,952 | 11/1962 | Vieli | 260—2.5 F |
| 3,329,631 | 7/1967 | Pilgrim | 260—2.5 F |
| 3,377,139 | 4/1968 | MacGregor et al. | 260—2.5 F |

SAMUEL H. BLECH, Primary Examiner

M. FOELAK, Assistant Examiner

U.S. Cl. X.R.

47—9, DIG. 7